United States Patent
Kusama et al.

(10) Patent No.: US 8,200,817 B2
(45) Date of Patent: Jun. 12, 2012

(54) STORAGE MANAGEMENT METHOD AND SERVER

(75) Inventors: Takato Kusama, Kawasaki (JP);
Hiroyuki Ochi, Yokohama (JP);
Toshiaki Matsuo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/236,222

(22) Filed: Sep. 19, 2011

(65) Prior Publication Data

US 2012/0011255 A1      Jan. 12, 2012

Related U.S. Application Data

(63) Continuation of application No. 12/893,718, filed on Sep. 29, 2010, now Pat. No. 8,041,813, which is a continuation of application No. 11/429,238, filed on May 8, 2006, now Pat. No. 7,822,847.

(30) Foreign Application Priority Data

Mar. 2, 2006 (JP) ................................. 2006-055695

(51) Int. Cl.
*G06F 15/173* (2006.01)

(52) U.S. Cl. ........................................ 709/224; 711/114

(58) Field of Classification Search .................... 709/224
See application file for complete search history.

(56) References Cited

U.S. PATENT DOCUMENTS

| | | | |
|---|---|---|---|
| 5,088,058 A | 2/1992 | Salsburg | |
| 6,446,161 B1 | 9/2002 | Yamamoto et al. | |
| 6,564,174 B1 | 5/2003 | Ding et al. | |
| 6,640,278 B1 | 10/2003 | Nolan et al. | |
| 6,779,078 B2 | 8/2004 | Murotani et al. | |
| 7,275,103 B1 * | 9/2007 | Thrasher et al. | .............. 709/224 |
| 7,412,504 B2 | 8/2008 | Hirata et al. | |
| 7,702,962 B2 | 4/2010 | Numanoi | |
| 2003/0005119 A1 | 1/2003 | Mercier et al. | |
| 2004/0002880 A1 | 1/2004 | Jones | |
| 2005/0088976 A1 | 4/2005 | Chafle et al. | |
| 2007/0061446 A1 | 3/2007 | Matsuo et al. | |
| 2008/0098110 A1 | 4/2008 | Takeda et al. | |

FOREIGN PATENT DOCUMENTS

| | | |
|---|---|---|
| JP | 10-320126 | 12/1998 |
| JP | 2001-337790 | 12/2001 |
| JP | 2004-246412 | 9/2004 |
| JP | 2005-309748 | 11/2005 |

OTHER PUBLICATIONS

Japan Patent Office office action on application No. 2006-055695 dated Apr. 19, 2011; pp. 1-2.

* cited by examiner

*Primary Examiner* — Ajay Bhatia
*Assistant Examiner* — Bryan Lee
(74) *Attorney, Agent, or Firm* — Foley & Lardner LLP

(57) ABSTRACT

When the application I/O performance problem is solved, the I/O amount from the application is increased. In the conventional technique, no consideration has been taken on the affect of the increase of the application I/O performance to other applications. A resource whose I/O load is reduced by setting modification of a storage subsystem is specified and the application using this resource is specified as an application whose I/O processing amount may be increased. Furthermore, the resource used by the specified application and another application using this resource are specified as a resource and an application whose I/O processing performance may be lowered by the setting modification.

13 Claims, 14 Drawing Sheets

FIG. 4

PERFORMANCE INFORMATION TABLE 201

| RESOURCE NAME 501 | PERFORMANCE TYPE 502 | PERFORMANCE VALUE 503 | DATA COLLECTION TIME 504 |
|---|---|---|---|
| SERVER 001a | CPU USE RATIO | 100% | 12:00 12/3 |
| SERVER SIDE PORT 023a | PORT USE RATIO | 100% | 12:00 12/3 |
| SERVER SIDE PORT 023b | PORT USE RATIO | 30% | 12:00 12/3 |
| RAID GROUP | USE RATIO | 56% | 12:00 12/3 |

FIG. 5

I/O PATH INFORMATION TABLE (202)

| APPLICATION NAME (401) | SERVER NAME (409) | DEVICE NAME (402) | SERVER SIDE PORT NAME (403) | STORAGE NAME (404) | STORAGE SIDE PORT NAME (405) | RAID GROUP NAME (406) | CACHE NAME (407) | LOGICAL VOLUME NAME (408) |
|---|---|---|---|---|---|---|---|---|
| APPLICATION 030a | SERVER 001a | DEVICE 1 | SERVER SIDE PORT 023a | STORAGE SUBSYSTEM 020 | STORAGE SIDE PORT 024a | RAID GROUP 033a | CACHE 1 | LOGICAL VOLUME 034a |
| APPLICATION 030b | SERVER 001b | DEVICE 2 | SERVER SIDE PORT 023b | STORAGE SUBSYSTEM 020 | STORAGE SIDE PORT 024b | RAID GROUP 033a | CACHE 2 | LOGICAL VOLUME 034b |
| APPLICATION 030c | SERVER 001b | DEVICE 3 | SERVER SIDE PORT 023c | STORAGE SUBSYSTEM 020 | STORAGE SIDE PORT 024c | RAID GROUP 033b | CACHE 3 | LOGICAL VOLUME 034c |
| APPLICATION 030d | SERVER 001c | DEVICE 4 | SERVER SIDE PORT 023d | STORAGE SUBSYSTEM 020 | STORAGE SIDE PORT 024c | RAID GROUP 033c | CACHE 4 | LOGICAL VOLUME 034d |
| APPLICATION 030e | SERVER 001d | DEVICE 5 | SERVER SIDE PORT 023e | STORAGE SUBSYSTEM 020 | STORAGE SIDE PORT 024d | RAID GROUP 033c | CACHE 5 | LOGICAL VOLUME 034e |
| APPLICATION 030f | SERVER 001f | DEVICE 6 | SERVER SIDE PORT 023f | STORAGE SUBSYSTEM 020 | STORAGE SIDE PORT 024e | RAID GROUP 033d | CACHE 6 | LOGICAL VOLUME 034f |

FIG. 7

APPLICATION LIST DISPLAY TABLE

| APPLICATION NAME | PREDICTED I/O AMOUNT AFTER MODIFICATION | REMARKS |
|---|---|---|
| APPLICATION A | NO CHANGE | BECAUSE CPU USE RATIO IS SATURATED |
| APPLICATION B | INCREASE | --- |
| APPLICATION D | NO CHANGE | BECAUSE SERVER SIDE PORT USE RATIO IS SATURATED |
| APPLICATION E | NO CHANGE | BECAUSE STORAGE SIDE PORT USE RATIO IS SATURATED |

FIG. 9

PERFORMANCE DETERIORATION APPLICATION LIST TABLE (900)

| APPLICATION NAME (901) | CAUSE (902) | OCCURRENCE CONDITION (903) | COUNTERMEASURE (904) |
|---|---|---|---|
| APPLICATION A | • PERFORMANCE OF PORT X IS LOWERED<br>• PERFORMANCE OF CACHE A IS LOWERED | WHEN I/O AMOUNT FROM APPLICATION B TO PORT X1 INCREASES | [1] LOAD OF PORT X1 IS CONTROLLED |
| APPLICATION B | • PERFORMANCE OF CACHE B IS LOWERED | WHEN I/O AMOUNT FROM APPLICATION B TO PORT X1 INCREASES | [1] LOAD OF PORT X1 IS CONTROLLED<br>[2] CACHE IS SET TO BE RESIDENT |
| ⋮ | ⋮ | ⋮ | ⋮ |

(304)

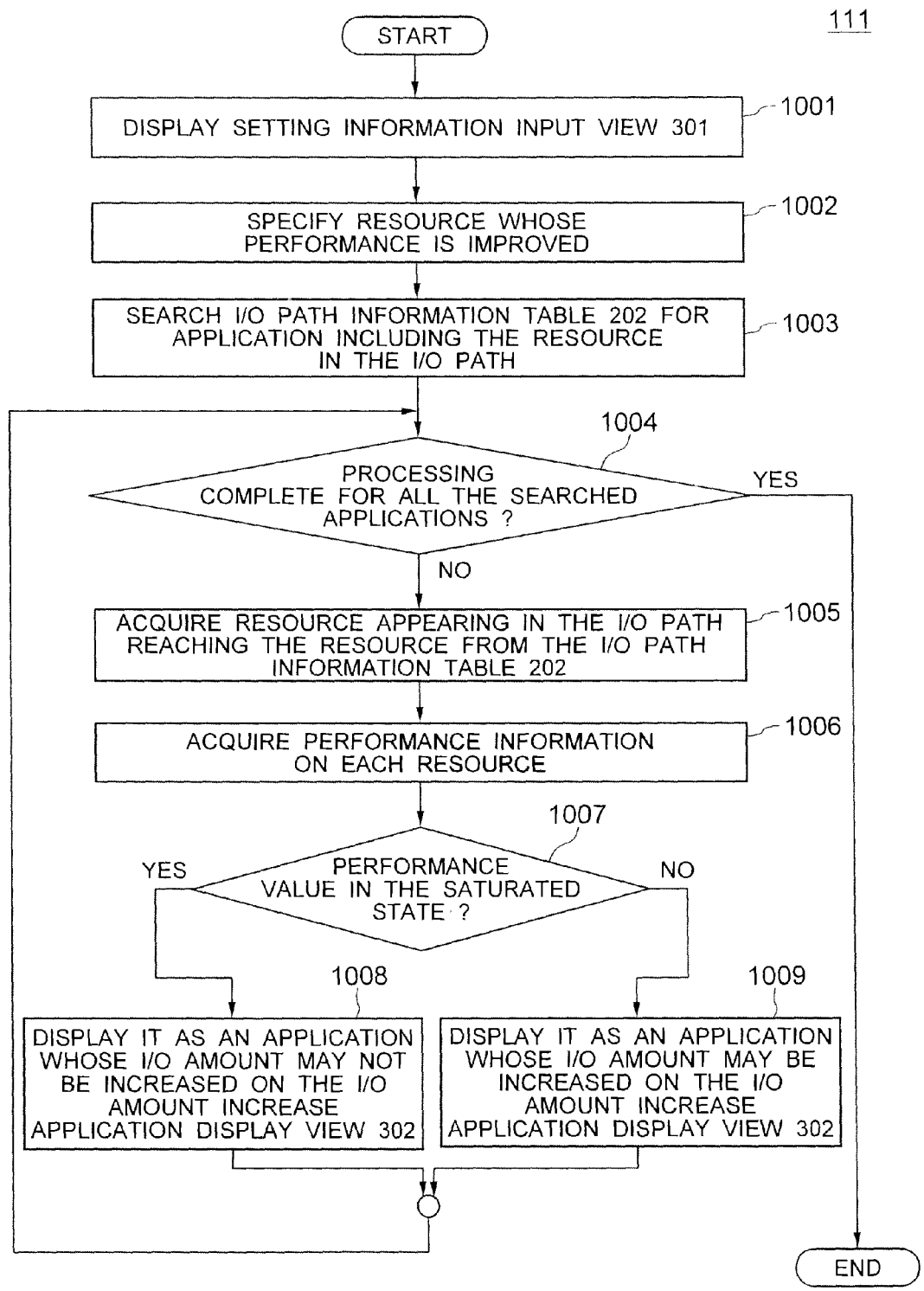

FIG. 13

(LIST OF CORRESPONDENCE BETWEEN RESOURCE SELECTION AND OPERATION AND SPECIFIED RESOURCES WHOSE PERFORMANCE IS IMPROVED FOR THE OPERATION OBJECT)

1300

| CASE | RESOURCE SELECTION 610 (1301) | OPERATION LIST 621 (DISPLAY MESSAGE) (1302) | RESOURCE LIST 622 (ASSOCIATED RESOURCE) (1303) | RESOURCE WHOSE PERFORMANCE IS IMPROVED (1304) (1305) |
|---|---|---|---|---|
| a | STORAGE SIDE PORT 024 | I/O AMOUNT FROM PARTICULAR DEVICE HAS HIGHER PRIORITY | DEVICE 032 | DEVICE 032 |
| b | STORAGE SIDE PORT 024 | I/O AMOUNT FROM PARTICULAR DEVICE IS SUPPRESSED | DEVICE 032 | STORAGE SIDE PORT 024 |
| c | CACHE 021 | PARTICULAR LOGICAL VOLUME IS SET TO BE RESIDENT | LOGICAL VOLUME 034 | LOGICAL VOLUME 034 |
| d | CACHE 021 | RESIDENT STATE OF PARTICULAR LOGICAL VOLUME IS RELEASED | LOGICAL VOLUME 034 | CACHE 021 |
| e | LOGICAL VOLUME 034 | USED PORT IS MODIFIED | STORAGE SIDE PORT 024 | STORAGE SIDE PORT 024 |
| f | LOGICAL VOLUME 034 | USED CACHE IS MODIFIED | CACHE 021 | CACHE 021 |
| g | LOGICAL VOLUME 034 | USED RAID GROUP IS MODIFIED | RAID GROUP 033 | RAID GROUP 033 |

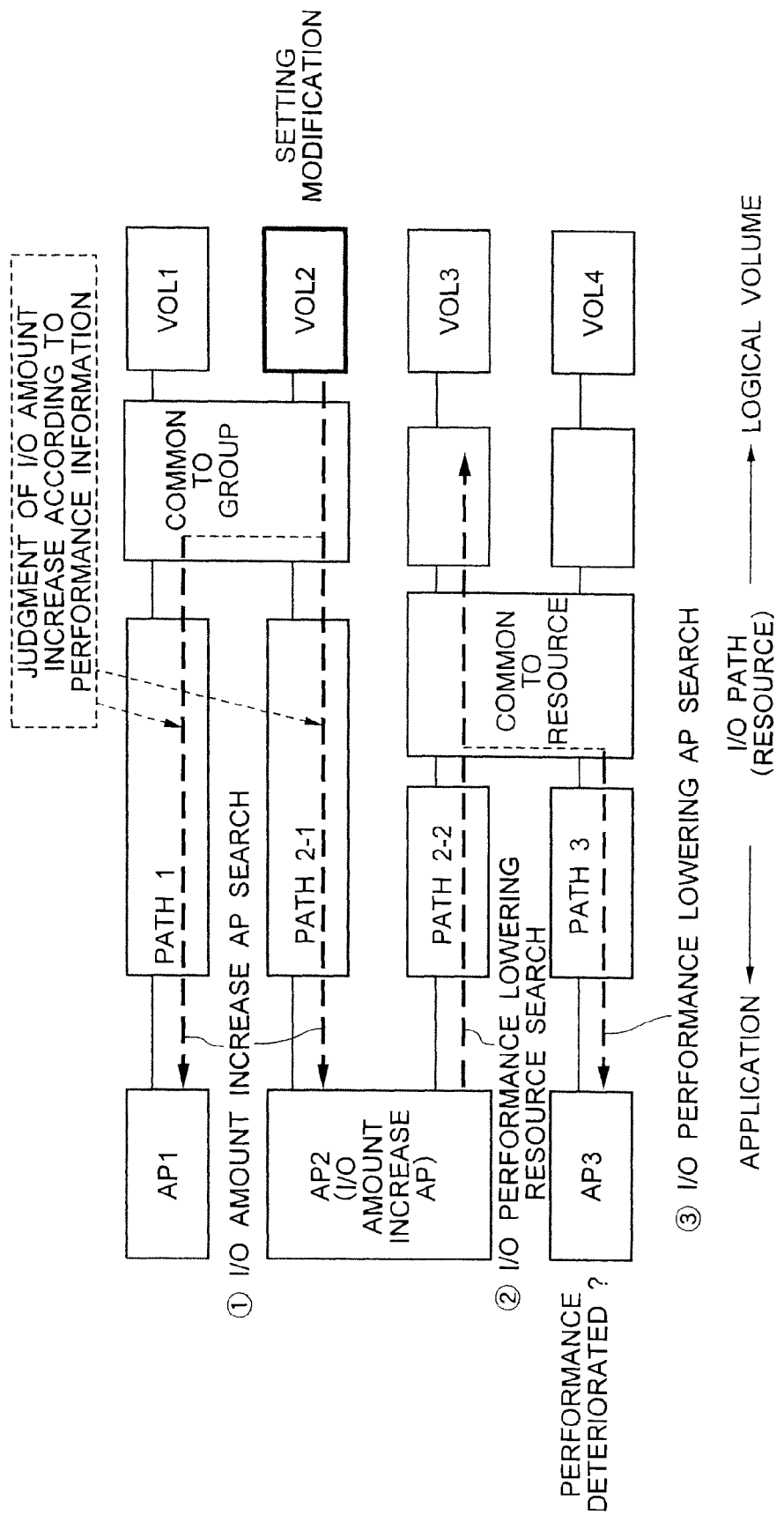

STORAGE MANAGEMENT METHOD AND SERVER

CROSS-REFERENCE TO RELATED PATENT APPLICATIONS

Japan Priority Application JP-2006-055695, filed Mar. 2, 2006 including the specification, drawings, claims and abstract, is incorporated herein by reference in its entirety. This application is a Continuation of U.S. application Ser. No. 12/893,718, filed Sep. 29, 2010, incorporated herein by reference in its entirety, which is a Continuation of U.S. application Ser. No. 11/429,238, filed May 8, 2006, incorporated herein by reference in its entirety.

BACKGROUND OF THE INVENTION

The present invention relates to a performance analysis method in an environment having at least one server and at least one storage subsystem.

As the storage capacity of each enterprise increases, more attention is paid on the techniques to reduce the storage management cost. One of such techniques is SAN (Storage Area Network). By using the SAN, a single storage device is shared by a plurality of task servers so as to localize the storage operation task, thereby reducing the storage operation management cost.

In a SAN environment, a single storage device is shared by a plurality of task servers and accordingly, I/O from the servers are concentrated in the single storage. For this, a storage administrator should periodically monitor the performance of the storage device so as to prevent an occurrence of a performance problem.

As a conventional technique for preventing the performance problem, for example, there is a method for realizing I/O load control between disk devices (for example, U.S. Pat. No. 6,446,161). In this method, according to the I/O load information in each disk device, data is moved from a disk device having a high I/O load to a disk device having a low I/O load, thereby realizing the I/O load distribution.

SUMMARY OF THE INVENTION

When an application performance problem is caused by the I/O performance in a SAN environment, a position of the I/O bottleneck should be identified and the storage setting should be modified. For example, when a performance problem is caused in a particular application by high loads of a disk device in the storage subsystem, a storage administrator allocates the I/O loads of the disk device to another disk device so as to reduce the loads of the disk device and solve the problem of the application I/O performance.

When the application I/O performance problem is solved, accesses from the application which has been suppressed by the high I/O loads are released and the I/O amount from the application is increased. However, as will be shown in a specific example below, it is known that such an increase of the application I/O performance may affect another application. That is, this may affect another system such as an online transaction system for which a high-speed I/O performance is required.

The affect of this problem will be explained in a specific example.

In the case of a database system requiring a high-speed response time, each time an update process is executed, user data is updated and a log file is updated. When the user data and the log file are stored in a single disk device, an I/O collision may occur and accordingly, they are normally stored in separate disk devices. Suppose an I/O performance problem has occurred in a disk device storing the user data. As the amount of the updated user data is lowered, the amount of updated log file acquired in synchronism with the updated user data is also lowered. Here, if the administrator improves the disk device performance containing the user data by the conventional technique, i.e., the I/O load distribution due to data migration, I/O processes which have been suppressed are released and accordingly, the amount of the updated log file is also increased and the I/O loads on the disk device containing the log file are also increased. Moreover, the I/O loads of resources or parts existing on the I/O path reaching the disk device are also increased. By increase of the loads of the resources or the parts, the I/O performance of the other application using them is deteriorated and a new performance problem may be caused.

Thus, when the application I/O performance is deteriorated by the storage subsystem as the bottleneck, setting of the storage subsystem should be modified. However, the conventional method does not identify the range of an affect to another application by solution of the bottleneck.

It is therefore an object of the present invention to grasp, in advance, an affect to the performance of the application, especially deterioration of the performance caused by storage subsystem setting modification for reducing the I/O loads. More specifically, the object of the present invention is to identify the application whose I/O performance is improved by the storage setting modification by using performance of a server or a storage and the I/O path information from the application.

Another object of the present invention is to identify a resource which exists on another path used by an application and whose I/O load may be increased by the increase of the I/O amount of the application whose I/O performance is improved.

Still another object of the present invention is to identify an application whose I/O performance may be deteriorated by the increase of the I/O amount from the application whose I/O performance is improved.

In a SAN environment including at least one storage subsystem and at least one server, each server constituting the SAN environment has a server information acquisition program for collecting information on applications operating on the server, devices as I/O operation objects of the applications, server side ports for SAN connection used by the devices, and connection between storage side ports and logic volumes as server side configuration information, and further collecting the CPU use ratio of the server and the use ratio of each server side port as server side performance information, and storing the collected information in a storage management server.

The storage management server firstly acquires information on a storage side port, a cache, and RAID group used by each of the logical volumes as the storage side configuration information and further acquires the use ratio concerning the logical volume, the storage side port, the cache, and the RAID group as the storage side performance information, and stores the acquired information in the storage management server. Furthermore, the storage management server displays a setting modification definition view for defining the contents of the setting to be modified for the storage subsystem and identifies the resource whose I/O load is reduced by the modification of the setting according to the setting contents set in the definition view and the acquired configuration information. Furthermore, the storage management server identifies applications using the identified resource according to the configuration information and identifies, among the identified applications, an application whose resource performance processing amount appearing on the path reaching the identified resource from the identified application does not exceed a processing-enabled amount and displays it as an application whose I/O processing amount may be increased. Thus, it is possible to identify an application whose I/O processing amount may be increased by the storage setting modification.

Moreover, the storage management server acquires a resource used by the application whose I/O processing amount may be increased from the configuration information and specifies the acquired resource as a resource whose I/O processing performance may be lowered by the storage setting modification.

Furthermore, the storage management server acquires another application using the resource whose I/O processing performance may be lowered from the configuration information and specifies the acquired application as an application whose I/O processing performance may be lowered.

According to the present invention, it is possible to identify an application whose I/O amount may be increased by eliminating the bottleneck, and a resource and an application whose I/O performance may be lowered by the increase of the I/O amount of the application.

Other objects, features and advantages of the invention will become apparent from the following description of the embodiments of the invention taken in conjunction with the accompanying drawings.

BRIEF DESCRIPTION OF THE DRAWINGS

FIG. 4 explains a performance information table 201 in the embodiment.

FIG. 5 explains an I/O path information table 202 in the embodiment.

FIG. 7 explains an I/O amount increase application display view 302 in the embodiment.

FIG. 9 explains an I/O performance lowering application display view 304 in the embodiment.

FIG. 10 explains an I/O amount increase application search engine 111 in the embodiment.

FIG. 13 is a specific resource list for identifying a resource whose performance is improved.

FIG. 14 shows relationships between the search engines and the processes.

DESCRIPTION OF THE EMBODIMENTS

A storage management system in the embodiment below is simplified as compared to an ordinary storage management system for simplifying the explanation. However, the scope of invention is not to be limited to the embodiment.

Description will now be directed to a first embodiment of the present invention.
(1) System Configuration
Firstly, referring to FIG. 1, explanation will be given on the system configuration of the present embodiment.

Figure 1:
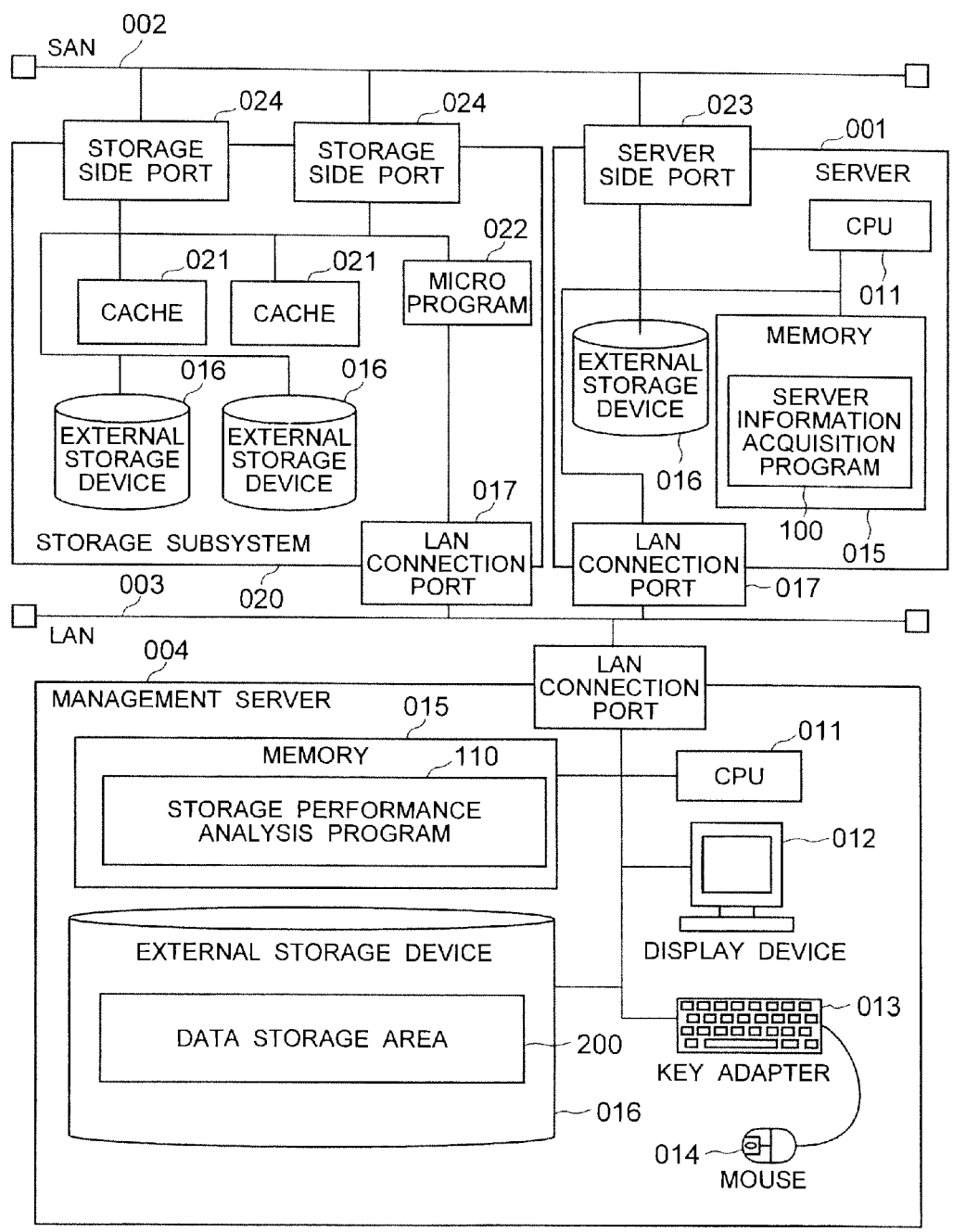
FIG. 1 is a block diagram showing system configuration of the present embodiment.

The system includes a plurality of storage subsystems 020, a plurality of servers 001, a management server 004, a LAN (Local Area Network) 003 connecting these components from one to another, and a SAN 002 connecting the storage subsystems 020 to the servers 001. In FIG. 1, for simplification, only one storage subsystem 020 and only one server 001 are shown. It should be noted that the LAN is connected to the components via respective LAN connection ports 017. Moreover, the SAN 002 is connected to the components via ports 023 and 024.

The server 001 includes a CPU 011, a memory 015, an external storage device 016, a LAN connection port 017, and a server side port 023. The management server 004 includes a CPU 011, a display device 012, a key adapter (keyboard) 013, a mouse 014, a memory 015, an external storage device 016, and a LAN connection port 017. In each server 001, a server information acquisition program 100 is executed. It should be noted that the server information acquisition program 100 is a program for acquiring operation information on the server 001. This will be detailed later.

Furthermore, in the management server 004, a storage performance analysis program 110 is executed. Moreover, information required for executing the storage performance analysis program 110 is held in a data storage area 200 in the external storage device 016. The storage performance analysis program 110 is a program for specifying the range of the affect to the application and the storage subsystem 020 by the storage configuration modification. This will be detailed later.

The storage subsystem 0202 is an apparatus including at least one external storage device 016, at least one LAN connection port 017, at least one cache memory (hereinafter, referred to as a cache) 021, a micro-program 022, and at least one storage side port 024.

It should be noted that the storage side port 024 reads data from the cache 021 or the external storage device 016 and writes data into the cache 021 or the external storage device 016 according to an I/O command sent from the server side port 023.

Figure 2:
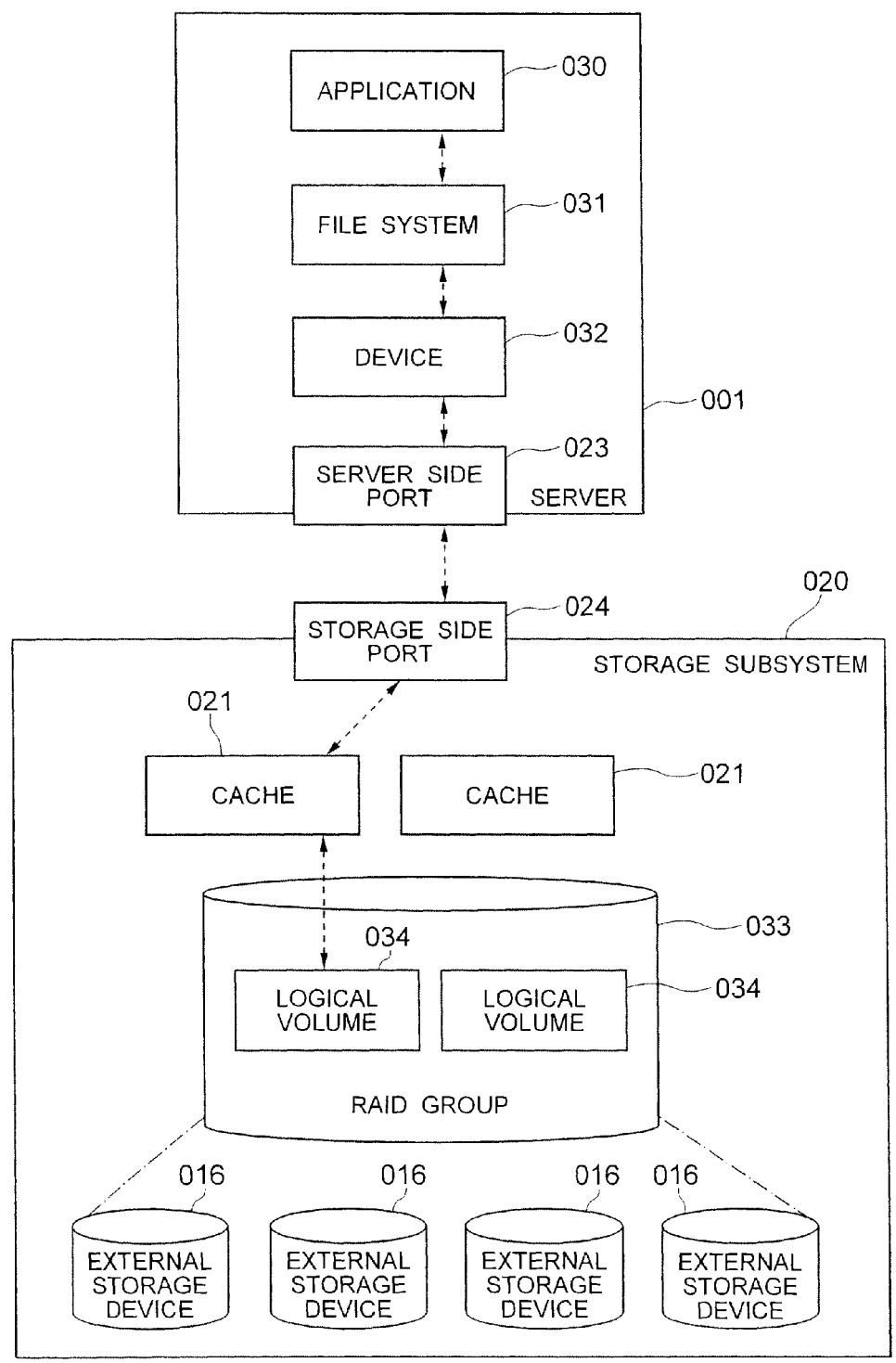
FIG. 2 explains the I/O flow from an application to an external storage device in the embodiment.

Moreover, the micro-program has a function for acquiring performance information on the external storage device 016, the cache 021, and the storage side port 024 and a function for modifying the setting of the storage configuration. More specifically, the micro-program 022 has a function constituting a RAID (Redundant Array of Inexpensive Disks) group having a RAID level specified by a plurality of external storage devices 016 and a function for creating a volume having a specified capacity from the RAID group. It should be noted that a volume created in the storage subsystem will be expressed as a logical volume. Moreover, the micro-program 022 also has a function to move a logical volume to another RAID group. Moreover, the micro-program 022 has a function for making data in a particular logical volume resident in the cache 021. Furthermore, the micro-program 022 has a function for suppressing the I/O amount from the particular server 001 or a device 032 shown in FIG. 2 for the particular storage side port 024 to a predetermined amount.
(2) I/O Flow
Next, explanation will be given on connection relationship between an application program (hereinafter, referred to simply as an application) and a storage subsystem with reference to FIG. 2. The micro-program 022 builds a RAID group 033 having a particular RAID level by a plurality of external storage devices 016. Moreover, the micro-program 022 creates a logical volume 034 having a specified capacity from the RAID group 033. The created logical volume 034 is recognized in the server 001, as a device 032 to which a file system 031 accesses via the storage side port 024 and the server side port 023. That is, device 016 is the target resource of the I/O operation when viewed from the file system 031, and one of resources on the path which I/O issues when viewed from a resource of the server side port 023 et seq. For example, the device 032 is a device driver for controlling a peripheral device. An OS (Operating System) on the server 001 creates a file having a particular size by the file system 031 according to a request from the application 030.

The I/O issued by the application 030 is sent to the storage side port 024 via the file system 031, the device 032, and the server side port 023. When a data acquisition I/O is sent to the storage side port 024 and the requested data is present in the cache 021, the data is returned. If the data is not present in the cache 021, data is acquired from the logical volume 034 used by the application 030. When a data write I/O is sent to the storage side port 024, data is written into the cache 021 and write completion is reported to the server 001. Furthermore, the requested data in the cache 021 is written into the logical volume 0334 used by the application 030.

It should be noted that for simplifying the explanation below, the device 032, the server side port 023, the storage side port 024, the cache 021, the logical volume 034, and the RAID group 033 will be called "resources" as a whole.

(3) Relationship between Programs

Figure 3:
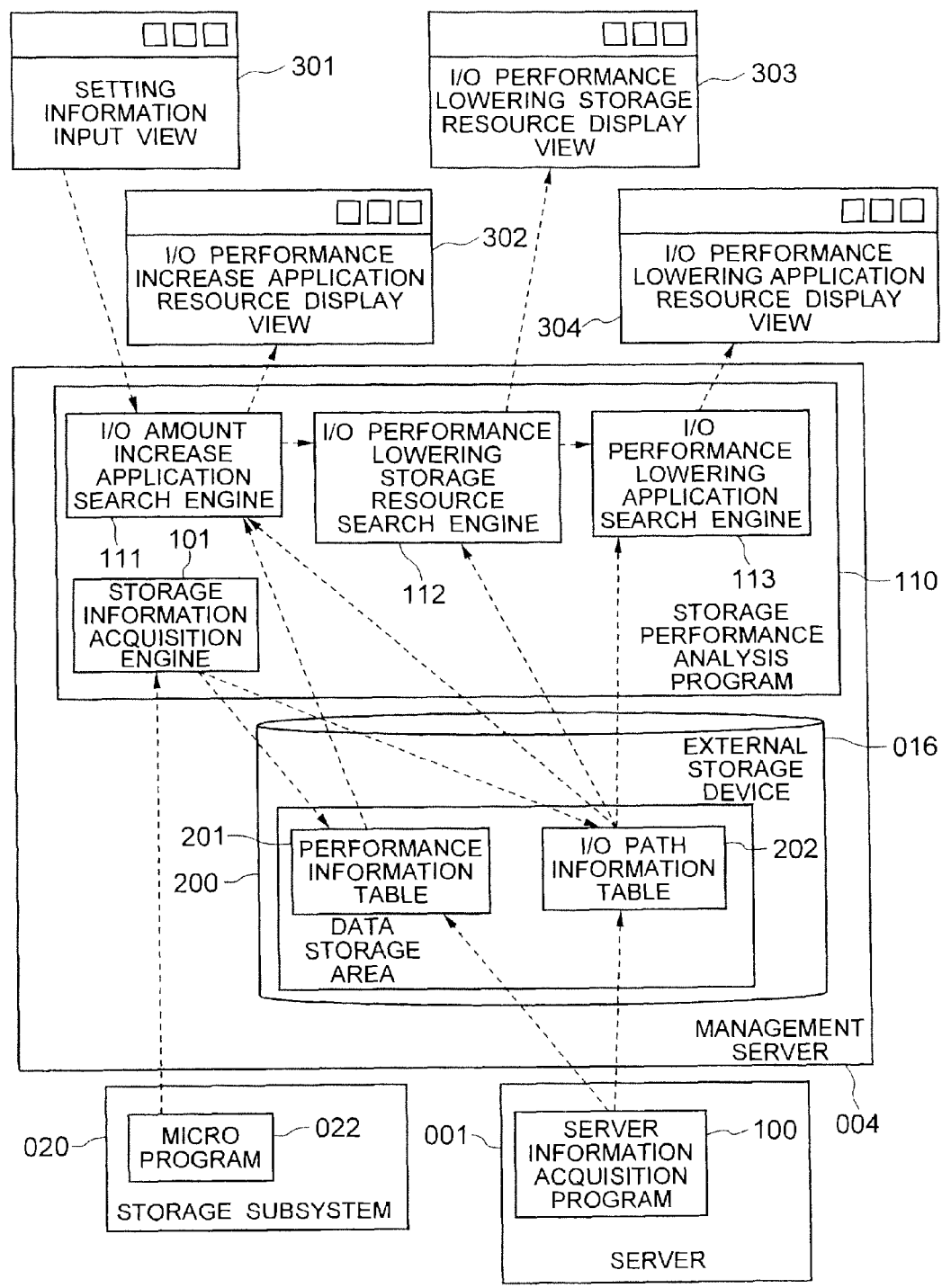
FIG. 3 explains data flows between programs in the embodiment.

Referring to FIG. 3, explanation will be given on the relationship between a server information acquisition program 100 operating in the server 001, a micro-program 022 operating in the storage subsystem 020, and a storage performance analysis program 110 operating in the management server 004.

The server information acquisition program 100 periodically acquires performance information on the server 001 and the I/O path information and stores the acquired information in a data storage area 200. It should be noted that the data storage area 200 is formed by a performance information table 201 holding performance information and an I/O path information table 202 holding the I/O path information.

More specifically, the server information acquisition program 100 acquires performance information on the CPU 011 in the server 001, the device 032, and the server side port 023 and stores the information in the performance information table 201. The performance information can be acquired by using a system call provided by the OS. Moreover, the server information acquisition program 100 acquires information on the file system 031 used by the application 030 and information on the device 032 used by the file system 031, the server side port 023 used by the device 032, and the logical volume 034 and stores these information in the I/O path information table 202. The relationship between the application 030 and the file system 031 can be acquired, for example, from API (Application Program Interface) provided by the application 030. Moreover, the relationship between the file system 031 and the device 032 can be acquired, for example, by using the OS system call. Furthermore, the relationship between the device 032, the server side port 023, and the logical volume 034 can be acquired, for example, by using an inquiry command of a SCSI (Small Computer System Interface).

As shown in FIG. 3, the storage performance analysis program 110 is formed by a storage information acquisition engine 101, an I/O amount increase application search engine 111, an I/O performance lowering storage resource search engine 112, and an I/O performance lowering application search engine 113.

The storage information acquisition engine 101 is a program for periodically acquiring performance information and configuration information on various devices in the storage subsystem 020 and storing the acquired information in the performance information table 201 and the I/O path information table 202.

The I/O amount increase application search engine 111 is a subprogram for acquiring setting modification for reducing the I/O load to be executed for the storage subsystem 020 by the storage administrator and identifying an application whose I/O amount may be increased by the setting modification. The I/O amount increase application search engine 111 displays a setting information input view 301 for inputting the setting modification, identifies an application whose I/O amount may be increased by using the contents set in the setting information input view 301, the performance information table 201, and the I/O path information table 202, and displays the identified result on the I/O amount increase application table view 302. This will be detailed later.

The I/O performance lowering storage resource search engine 112 is a program for identifying a resource in the storage whose I/O load may be increased by the setting modification specified on the setting information input view 301 and the I/O amount increase from the application 030 displayed on the I/O amount increase application display view 302. According to the output result of the I/O amount increase application search engine 111 and the data in the I/O path information table 202, the I/O performance lowering storage resource search engine 112 identifies a resource in the storage whose I/O performance may be lowered and outputs it to the I/O performance lowering storage resource display view 303. This will be detailed later.

The I/O performance lowering application search engine 113 is a program for identifying an application 030 whose I/O performance may be lowered by the increase of the I/O amount from the resource displayed on the I/O performance lowering storage resource display view 303. According to the output result of the I/O performance lowering storage resource search engine 112 and the data in the I/O path information table 202, the I/O performance lowering application search engine 113 identifies an application whose I/O performance may be lowered and outputs it to the I/O performance lowering application display view 304. This will be detailed later.

Referring to FIG. 14, explanation will be given on outline of the processes performed by the search engines 111, 112, and 113 and the relationship with the object to be processed. The arrows shown by solid broken lines in FIG. 14 indicate processes for extracting a particular resource and application contained in the path by searching the I/O path information table 202.

An application AP1 uses a logical volume VOL 1 via a path 1 and an application AP2 uses a logical volume VOL 2 via a path 2-1 and a logical volume VOL 3 via a path 2-2. The logical volume VOL 1 and VOL 2 belong to the same RAID group. An application AP3 uses a logical volume VOL 4 via a path 3 and some of the resources on the path 3 are common to the path 2-2. Hereinafter, it is assumed that the I/O load is reduced for the logical volume VOL 2 used by the application AP2.

[1] When setting modification (such as movement of a logical volume) for reducing the I/O load for the logical volume VOL 2 is performed, the I/O amount increase application search engine 111 searches the I/O path (path 2-1) from VOL 2 to the application AP2 and the I/O path (path 1) from the logical volume VOL 1 sharing the RAID group with VOL 2 to the application AP1 according to the I/O path information table 202 and identifies an application (AP2 in the figure) connected to the path containing a resource whose I/O amount may be increased among the resources on the I/O path according to the performance information table 201. As for the application AP1, suppose that the I/O amount of at least one resource contained on the I/O path (path 1) connected to the AP1 has already (before setting modification) reached the upper limit according to the performance information table 201. As a result, the application API judges that the possibility of increase of the I/O amount is low even if setting modification is performed so as to reduce the I/O load for the logical volume VOL 2.

[2] The I/O performance lowering storage resource search engine 112 searches another path (path 2-2) connected to the identified I/O amount increase application (AP2) according to the I/O path information table 202, thereby identifying a resource on a path (path 2-2) whose I/O performance may be lowered by increase of the I/O amount of the I/O amount increase application (AP2).

[3] The I/O path performance application search engine 113 searches further another path (path 3) commonly containing the resource identified by [2] according to the I/O information table 202 and identifies the application (AP3) connected to the searched path as an I/O performance lowering application. That is, the application connected to still another path (path 3) sharing some of the resources on the other path (path 2-2) containing a resource whose I/O performance may be lowered by the I/O amount increase of the I/O amount increase application is identified as an application whose I/O performance may be lowered.

(4) Data Storage Area

Explanation will be given on a data storage area according to an embodiment of the present invention. Tables explained below are contained in a data storage area 200 in the external storage device 016 of the management server 004.

Firstly, referring to FIG. 4, explanation will be given on a performance information table 201. The performance information table 201 has columns as follows: a resource name 501, a performance type 502, a performance value 503, and a data collection time 504. The server information acquisition program 100 and the storage information acquisition engine 101 acquire various performances of the server 001 or the storage subsystem 020 and add the acquired information as a record to the performance information table 201.

For example, the server information acquisition program 100 periodically acquires the use ratio of the CPU 011 and stores "CPU (server 1)" in the resource name 501, "CPU use ratio" in the performance ratio 502, the acquired performance value in the performance value 503, and the data acquisition time in the data acquisition time 504. These information are configured as a single record. Moreover, the server information acquisition program 100 can also store the use ratio of the server side port 023 similarly in the performance information table. Moreover, the storage information acquisition engine 101, similarly, periodically can acquire the use ratio of the storage side port 0224, the use ratio of the cache 021, and the use ratio of the RAID group 033 and store the acquired information as a record in the performance information table 201.

Next, referring to FIG. 5, explanation will be given on an I/O path information table 202. The I/O path information table 202 has following columns: an application name 401, a server name 409, a device name 402, a server side port name 403, a storage name 404, a storage side port name 405, a RAID group name 406, a cache name 407, and a logical volume name 408. The table shows configuration of a plurality of resources on the path and connection relationships between resources. The server information acquisition program 100 and the storage information acquisition engine 101 acquire configuration information on the server 001 or the storage subsystem 020 and add the acquired information as a record to the I/O path information table 202.

For example, the server information acquisition program 100 acquires the name of the application 030 and the device 032 used by the application 030 by the API provided by the application 030 and stores the acquired information in the application name 401 and the device name 402, respectively. Moreover, the server name is acquired from the server 001 and the acquired information is stored in the server name 409. Furthermore, the server information acquisition program 100 executes the inquiry command of SCSI to each device registered in the device name 402 so as to acquire the server side port 023 used by the device 032, the storage 020, the storage side port 0224, and the name of logical volume 034 and registers the acquired information in the respective columns. Moreover, the storage information acquisition engine 101 acquires the RAID group 033 used by the logical volume 034 and the name of the cache 021 from the micro program 022 for each of logical volumes 034 contained in the I/O path information table 202 and registers the acquired information in the respective columns.

(5) Explanation of Views

Next, referring to FIG. 6 to FIG. 9, detailed explanation will be given on each of the views displayed on the display device 012 of the management server 004 by the storage performance analysis program 110.

(5-1) Setting Information Input View 301

Figure 6:
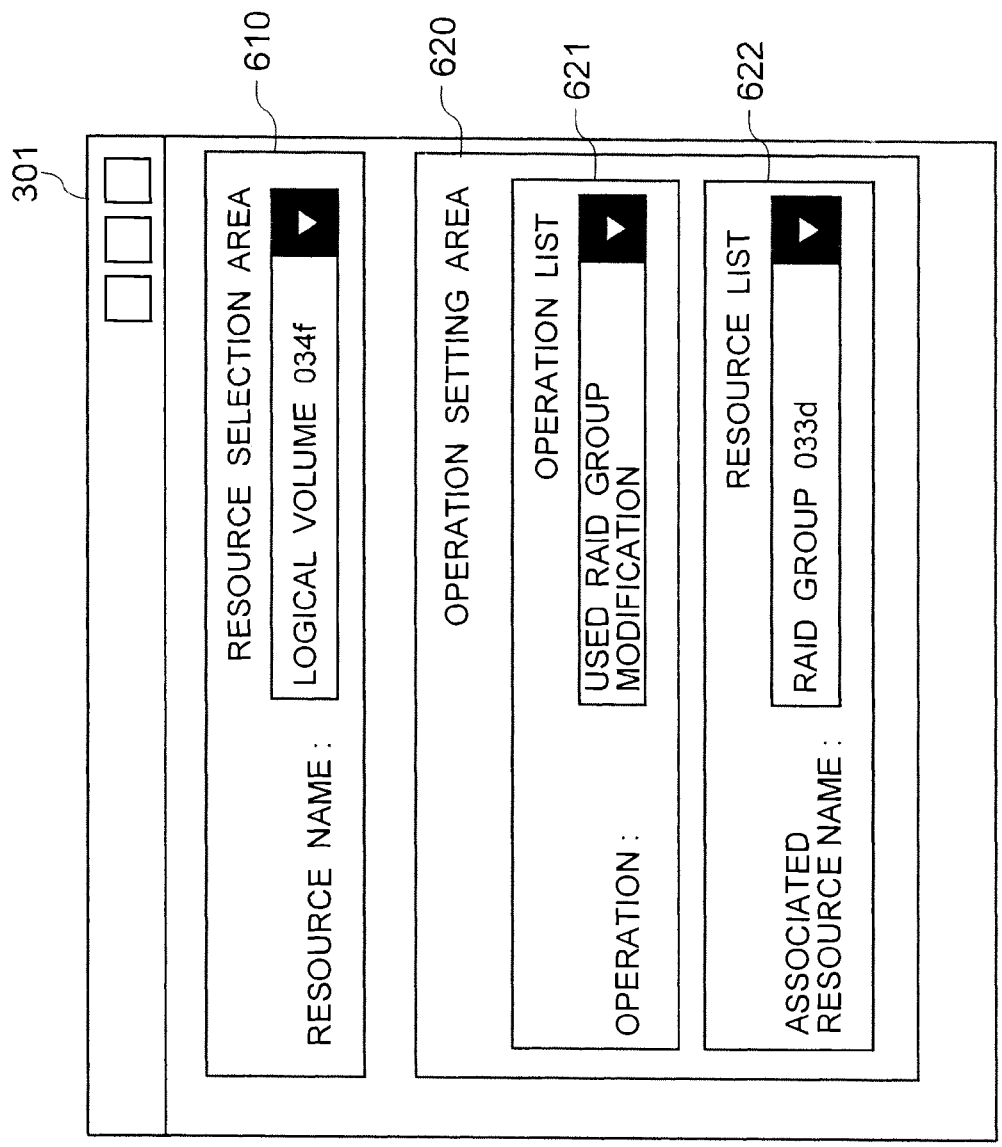
FIG. 6 explains a setting information input view 301 in the embodiment.

FIG. 6 shows an example of a setting information input view 301 according to the present embodiment. The setting information input view 301 is plotted by the I/O amount increase application search engine 111 for receiving information on the operation set for the storage subsystem 020 to be executed by the storage administrator. Moreover, the setting information input view 301 is formed by a resource selection area 610 and an operation setting area 620. The I/O amount increase application search engine 111 displays a list of object resources whose setting is to be modified in the resource selection area 610. For example, the storage side port 024, the cache 021, and the logical volume 034 contained in the I/O path information table 202 are displayed. Moreover, the I/O amount increase application search engine 111 displays a list 622 of resources associated with an operation list 621 of the operations associated with the resources selected in the resource selection area 610.

Correspondence relationships between the contents displayed in the resource selection area 610, the operation list 621, and the resource list 622 are stored in a table shown in FIG. 13 which will be detailed later.

For example, if the storage side port 024 is selected from the object resource list in the resource selection area 610, the I/O amount increase application search engine 111 displays "I/O amount suppression from a particular device" and "I/O amount priority from a particular device" as the operation list 621. Furthermore, the I/O amount increase application search engine 111 displays a list of devices using the storage side port 024 specified in the resource selection area 610, in the resource list 622. It should be noted that information in the resource list 622 may be searched from the information in the I/O path information table 202.

Moreover, if the cache 021 is selected from the object resources in the resource selection area 610, the I/O amount increase application search engine 111 displays "setting a particular logical volume to a resident state" and "release of the resident state of a particular logical volume" as the operation list 621. Furthermore, the I/O amount increase application search engine 111 displays a list of logical volume 034 using the cache 021 specified in the resource selection area 610, in the resource list 622. It should be noted that the information in the resource list 622 may be searched from the information in the I/O path information table 202.

Moreover, if the logical volume 034 is selected from the object resources in the resource selection area 610, the I/O amount increase application search engine 111 displays "used port modification", "used cache modification", and "used RAID group modification" as an operation list 621. Furthermore, when "used port modification" is selected in the operation list 621, the I/O amount increase application search engine 111 displays a port list in the resource list 622. Moreover, when "used cache modification" is selected in the operation list 621, a cache list is displayed on the resource list 622. Moreover, when "used RAID group modification" is selected on the operation list 621, a RAID group list is displayed on the resource list 622. Information in these resource lists 622 may be searched from the information in the I/O path information table 202.

(5-2) I/O Amount Increase Application Display View 302

FIG. 7 shows an example of the I/O amount increase application display view 302 according the present embodiment. The I/O amount increase application display view 302 is plotted by the I/O amount increase application search engine and outputs the output result of the I/O amount increase application search engine 111.

As shown in FIG. 7, the I/O amount increase application display view 302 is formed by an application list display table 700. The application list display table 700 has following columns: an application name 701, I/O prediction amount after modification 702, and remarks 703. The display contents of the columns 702 and 703 of the table 700 shown in FIG. 7 are obtained from the performance information table 201 and the execution result of the I/O amount increase application search engine 111.

(5-3) I/O Performance Lowering Storage Display View 303

Figure 8:
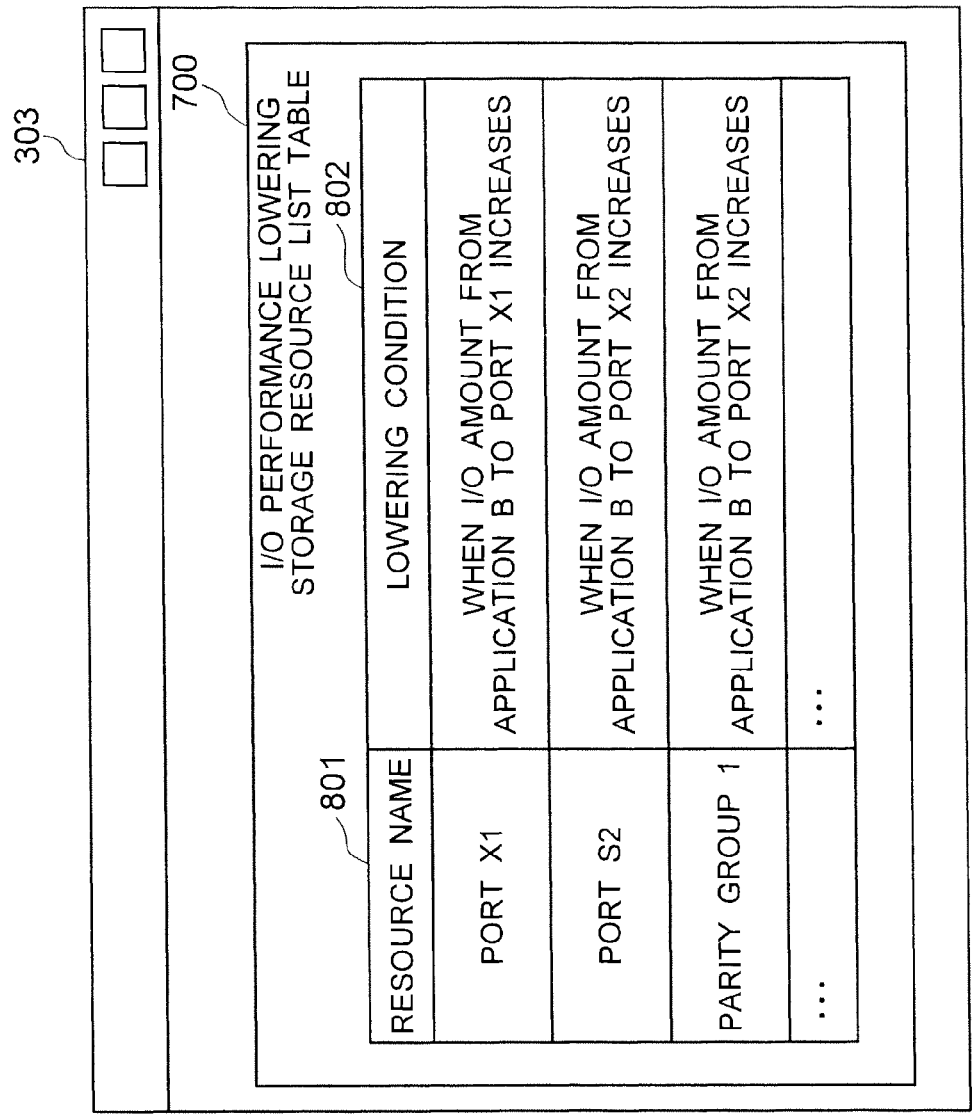
FIG. 8 explains an I/O performance lowering storage resource display view 303 in the embodiment.

FIG. 8 shows an example of the I/O performance lowering storage display view 303 in the present embodiment. The I/O performance lowering storage display view 303 is plotted by the I/O performance lowering storage resource search engine 112 and outputs the output result of the I/O performance lowering storage resource search engine 112.

As shown in FIG. 8, the I/O performance lowering storage display view 303 is formed by an I/O performance lowering storage resource list table 800. The I/O performance lowering storage resource list table 800 has following columns: a resource name 801 and a lowering condition 802. The display contents of the column 802 of the table 800 shown in FIG. 8 can be obtained from the execution result of the I/O performance lowering storage resource search engine 112.

(5-4) I/O Performance Lowering Application Display View 304

FIG. 9 shows an example of the I/O performance lowering application display view 304 in the present embodiment. The I/O performance lowering application display view 304 is plotted by the I/O performance lowering application search engine 113 and outputs the output result of the I/O performance lowering application search engine 113.

As shown in FIG. 9, the I/O performance lowering application display view 304 is formed by a performance deterioration list table 900. The performance deterioration application list table 900 has following columns: an application name 901, a cause 902, a generation condition 903, and a countermeasure plan 904. The display contents of the column 902 of the table 900 shown in FIG. 9 can be obtained from the execution result of the I/O performance lowering application search engine 113. The display contents of the column 903 of the table 900 shown in FIG. 9 can be obtained from the execution result of the I/O performance lowering storage resource search engine 112 like the column 802 of FIG. 8. Furthermore, a IF-THEN type rule having the display contents of the columns 902 and 903 in the preamble and the display contents of the column 904 in the conclusion is stored in a rule table in advance so that the display contents of the column 904 are displayed by using the rule table.

(6) Storage Performance Analysis Program Details

Next, detailed explanation will be given on the I/O amount increase application search engine 111, the I/O performance lowering storage resource search engine 112, and the I/O performance lowering application search engine 113.

(6-1) I/O Amount Increase Application Search Engine 111

Firstly, FIG. 10 shows an example of the I/O amount increase application search engine 111.

The I/O amount increase application search engine 111 firstly displays a setting information input view 301 (step 1001).

Next, according to the information inputted by the setting information input view 301, a resource whose performance is improved is identified (step 1002). FIG. 13 shows a list 1300 of resources whose performance is improved. The list 1300 shown in FIG. 13 is stored in the data storage area 200 in the external storage device 016 of the management server 004. The list 1300 has following columns: a case 1301, a resource selection 1302, an operation list 1303, a resource list 1304, and a performance improvement resource 1305. The columns 1302, 1303 and 1304 correspond to the contents displayed in the areas 610, 621 and 622 of FIG. 6, respectively.

Contents of FIG. 13 are as follows. When operations shown in the operation list 621 are executed for the resources shown in the resource selection 610, the I/O amount is modified from the associated resources shown in the resource list 622 to the resources shown in the resource list 610 in the case of (a) to (d) and the I/O load of the associated resources shown in the resource list 622 is reduced in the case if (e) to (g).

This step identifies a resource whose performance is improved according to the list shown in FIG. 13. More specifically, a resource is identified as follows.

(a) Case when the storage side port 024 is selected in the resource selection area 610 and "I/O amount priority from a particular device" is selected in the operation list 621:

In this case, the I/O request to the storage side port 024 selected in the resource selection area 610 from the device 032 selected in the resource list 622 has a higher priority. Accordingly, the response performance of the I/O issued to the selected storage side port 024 from the device 032 is normally improved. The I/O amount increase application search engine 111 acquires the device 032 selected in the resource list 622 and specifies the acquired device 032 as a resource whose I/O performance is improved.

(b) Case when the storage side port 024 is selected in the resource selection area 610 and "I/O amount suppression from a particular device" is selected in the operation list 621:

In this case, the I/O request to the storage side port 024 selected in the resource selection area 610 from the device 032 selected in the resource list 622 is suppressed. Accordingly, the load of the selected storage side port 024 is reduced and the performance of the selected storage side port 024 is normally improved. The I/O amount increase application search engine 111 acquires the storage side port 024 selected in the resource selection area 610 and specifies the acquired storage side port 024 as a resource whose I/O performance is improved.

(c) Case when the cache 021 is selected in the resource selection area 610 and "setting a particular volume to a resident state" is selected in the operation list 621:

In this case, data in the logical volume 034 selected in the resource list 622 is resident in the cache 021 and the I/O response performance of the selected logical volume 034 is normally improved. The I/O amount increase application search engine 111 acquires the logical volume 034 selected in the list 622 and specifies the acquired logical volume 034 as a resource whose I/O performance is improved.

(d) Case when the cache 021 is selected in the resource selection area 610 and "release of a particular volume from the resident state" is selected in the operation list 621:

In this case, the area of the cache 021 used by the logical volume 034 is released and accordingly, the performance of the cache 021 which has been used is improved. The I/O amount increase application search engine 111 acquires the cache 021 selected in the resource selection area 610 and specifies the acquired cache 021 as a resource whose I/O performance is improved.

(e) Case when the logical volume 034 is selected in the resource selection area 610 and "used port modification" is selected in the operation list 621:

In this case, the load on the storage side port 024 selected in the resource list 622 from the logical volume 034 selected in the resource selection area 610 is reduced. Accordingly, the load on the selected storage side port 024 is normally reduced. The I/O amount increase application search engine 111 acquires the storage side port 024 selected in the resource list 622 and specifies the acquired storage side port 024 as a resource whose I/O performance is improved.

(f) Case when the logical volume 034 is selected in the resource selection area 610 and "used cache modification" is selected in the operation list 621:

In this case, the load on the cache 021 selected in the resource list 622 from the logical volume 034 selected in the resource selection area 610 is reduced. Accordingly, the load on the selected storage side cache 021 is normally reduced. The I/O amount increase application search engine 111 acquires the storage side cache 021 selected in the resource list 622 and specifies the acquired cache 021 as a resource whose I/O performance is improved.

(g) Case when the logical volume 034 is selected in the resource selection area 610 and "used RAID group modification" is selected in the operation list 621:

In this case, the load on the RAID group 033 selected in the resource list 622 from the logical volume 034 selected in the resource selection area 610 is reduced. Accordingly, the load on the selected RAID group 033 is normally reduced. The I/O amount increase application search engine 111 acquires the RAID group 033 selected in the resource list 622 and specifies the acquired RAID group 033 as a resource whose I/O performance is improved.

Furthermore, the I/O amount increase application search engine 111 searches for an application 030 containing a resource which has been specified in step 1002 as a resource whose performance is improved in the I/O path, from the I/O path information table 202 (step 1003). For example, when the resource specified in step 1002 is a RAID group 033, a record having the name of the RAID group 033 in the RAID group name 406 is searched from the I/O path table 202, thereby specifying an application.

It should be noted that in this step some applications are excluded according to the contents specified in the operation setting area 620. More specifically, when "suppression of I/O amount from a particular device" or "release of the resident state of a particular logical volume" is selected, it is clear that the application performance will not be improved and the application using the device 032 or the logical volume 034 selected in the resource list 622 is excluded. Moreover, when the logical volume 034 is selected in the resource selection area 610, the application 030 using the logical volume 034 is excluded. The application 030 to be excluded can be searched from the I/O path information table 202.

Furthermore, the I/O amount increase application search engine 111 checks (step 1004) whether the process of step 1005 et seq. have been performed for the application 030 acquired in step 1003. If the processes have been executed for all the searched applications 030, the processing is terminated. Otherwise, one of the applications 030 is selected from the application list acquired in step 1003 and control is passed to step 1005.

Next, the I/O amount increase application search engine 111 searches (step 1005) for resources appearing on the I/O path from the application 030 selected in step 1004 to the resource selected in step 1002. It should be noted that the resource on the I/O path can be acquired from the I/O path information table 202. More specifically, a record having the application 030 selected in step 1004 and the resource acquired in step 1002 as values is searched from the I/O path information table 202, thereby acquiring the resource on the I/O path.

Moreover, the I/O amount increase application search engine 111 acquires performance information for each of the resources acquired in step 1005, from the performance information table 201 (step 1006).

Furthermore, the I/O amount increase application search engine 111 checks whether the performance information acquired in step 1006 includes a resource exceeding the upper limit of the processing. If such a resource exists, control is passed to step 1008. Otherwise, control is passed to step 1009 (step 1007).

It should be noted that the processing upper limit can be checked, for example, by checking the I/O processing time per unit time. For example, when the CPU use ratio or resource use ratio is 100%, it is judged that the server having the CPU or the resource has reached the processing upper limit. Moreover, the I/O amount increase application search engine 111 displays a view for setting the processing upper limit and can judge whether the processing upper limit is reached, by using the set value.

Furthermore, when the function provided by the micro-program 022 to suppress the I/O amount from a particular device 032 for a particular storage side port 024 is used or when the I/O amount from the device 032 for the storage side port 024 exceeds a predetermined amount, it is possible to assume that the storage side port 024 has reached the processing upper limit. It should be noted that the setting information may be acquired, for example, from the micro-program 022.

In step 1008, the application 030 selected in step 1004 is displayed as an application 0303 which cannot increase the I/O amount in the I/O amount increase application display view 302. Moreover, the performance type which disabled I/O increase is also displayed. Thus, it is possible to grasp the application 030 whose I/O performance is not improved even if the modification set in the setting information input view 301 is modified. Furthermore, by displaying not only the application 030 but also the performance type disabling the I/O amount increase, it is possible to know which performance information is the performance bottleneck and which performance information should be improved to improve the I/O performance of the application 030. For example, when the server CPU use ratio is the cause, an unnecessary service is stopped and the CPU is intensified so as to improve the performance.

In step 1009, the application selected in step 1004 is displayed as the application 030 whose I/O amount can be increased on the I/O amount increase application display view 302. Thus, it is possible to grasp the application 030 whose I/O performance may be improved by the modification set in the setting information input view 301. Furthermore, by displaying the grasped applications 030 in a list, it is possible to confirm that the I/O performance of the application 030 not requiring a high-speed I/O performance such as a test application is not improved.

(6-2) I/O Performance Lowering Storage Resource Search Engine 112

Figure 11:
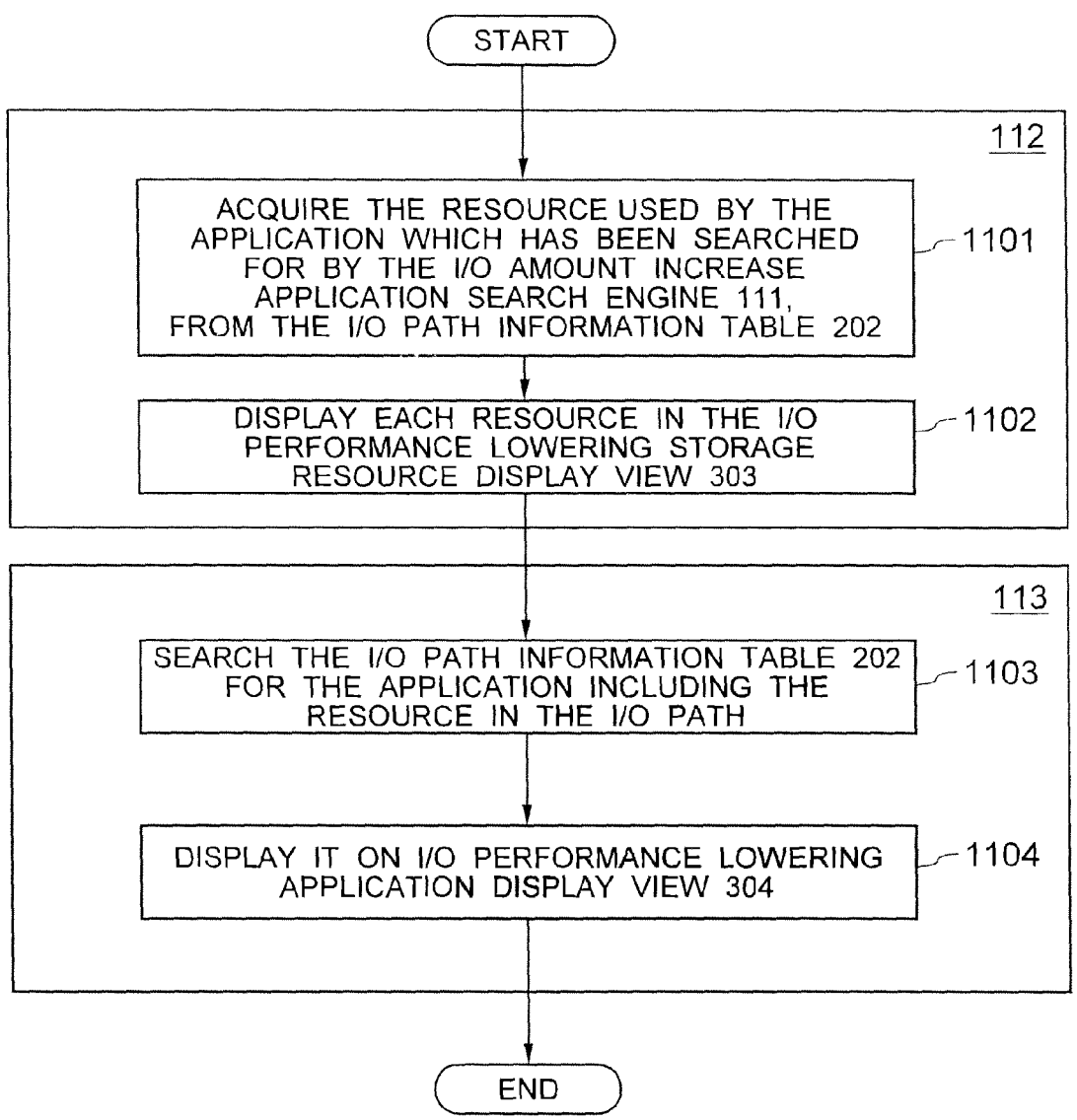
FIG. 11 explains an I/O performance lowering storage resource search engine 112 and an I/O performance lowering application search engine 113 in the embodiment.

FIG. 11 shows an I/O performance lowering storage resource search engine 112 according to an embodiment.

Firstly, the I/O performance lowering storage resource search engine 112 specifies a resource used by the application 030 whose I/O amount may be increased according to the I/O path information table 202, from the applications 030 which are displayed on the I/O amount increase application display view 302 as applications whose I/O amount may be increased (step 1101). For example, a record having the application 030 displayed on the I/O amount increase application display view 302 as applications whose I/O amount may be increased is searched from the I/O path information table 202 and by referencing the storage side port name 405, the RAID group name 406, the cache name 407, and the logical volume name 408 from the searched record, it is possible to acquire a list of resources used by the application 030 whose I/O amount may be increased.

Next, the I/O performance lowering storage resource search engine 112 displays the resource acquired in step 1101 on the I/O performance lowering storage resource display view 303 (step 1102). Thus, it is possible to grasp the range of affect of the storage setting modification to the resource in the storage.

In general, when the I/O performance of the storage side port 024, the cache 021, the RAID group 033 is deteriorated by execution of a plenty of I/O commands issued to a particular device 032, it is effective to suppress the I/O amount between the device 032 and the storage side port 024 used by the device 032. By using this method, it is possible to solve the problem of the performance of the storage side port 024, the cache 021, or the RAID group 033.

According to the present embodiment, as shown in FIG. 8, the application 030 whose I/O amount may be increased by the setting modification of the storage subsystem 020 and the storage side port 024 used by the application are displayed at the lowering condition 802 and the resource used by the application whose I/O amount may be increased is displayed at the resource name 801. Accordingly, the storage administrator can judge a method to prevent an affect of the application 030 whose I/O amount is increased by the setting modification of the storage subsystem 020. It should be noted that the information for judging the affect can be acquired by fetching the application name 401 and the storage side port name 405 from the record acquired in step 1101.

For example, suppose that setting modification of the storage subsystem 020 is found to increase the I/O amount from the application 020 (application A) requiring a high-speed I/O performance such as a DB server and an application 020 (application B) not requiring a high-speed I/O performance such as a test server. In this case, the I/O amount from the application B is limited at the storage side port 024, so as to prevent the affect by the I/O amount increase of the application B.

(6-3) I/O Performance Lowering Application Search Engine 113

FIG. 11 shows an I/O performance lowering application search engine 113 according to an embodiment.

Firstly, the I/O performance lowering application search engine 113 searches for the application 030 including the resource searched in step 1101 in the I/O path from the I/O path information table 202 (step 1103). For example, the I/O performance lowering application search engine 113 searches for a record having the resource specified in step 1101 and contained in one of the storage side port name 405, the RAID group name 406, the cache name 407, and the logical volume name 408, from the I/O path information table 202 and acquires the application name 401 contained in the searched record.

Step 1103 specifies the application connected to another path commonly including the I/O performance lowering resource contained in the path used by the I/O amount increase application, as the I/O performance lowering application.

Next, the I/O performance lowering application search engine 113 displays the application 030 acquired in step 1103 on an I/O performance lowering application display view 304 (step 1104). Thus, it is possible to grasp the range of affect of the storage setting modification to the application 030.

Moreover, as shown in FIG. 9, the resource specified in step 1101 can be displayed in the cause 902 as a resource causing lowering of the I/O performance of the application 030 specified in step 1103. Thus, the application 030 whose I/O performance may be lowered by the storage modification is displayed in the application name 901, and the resource as the cause is displayed in the cause 902, thereby specifying a resource to be monitored after the storage setting modification. Moreover, by setting the relationship between the cause of the I/O performance lowering and its countermeasure in advance, it is possible to indicate a countermeasure candidate for preventing the I/O resource performance lowering of the resource displayed in the cause 902 as shown in the countermeasure candidate in FIG. 9.

For example, when the storage side port 024 causes the I/O performance lowering of the application 030 whose I/O performance may be lowered, it is possible to prevent the I/O performance lowering of the application or reduce the degree of the affect by "setting a higher priority to the I/O amount from the application 030". Moreover, when the cache 021 causes the I/O performance lowering of the application 030, it is possible to prevent the I/O performance lowering of the application 030 or reduce the degree of the affect by "setting the logical volume used by the application 0303 to a state resident in the cache 021". It should be noted that the logical volume used by the application 030 can be acquired by referencing the logical volume name 408 contained in the I/O path information table 202. Furthermore, when the RAID group 033 causes the I/O performance lowering of the application 030, it is possible to prevent the I/O lowering of the application 030 or reduce the degree of the affect by "reducing the load on the RAID group 033".

By using the aforementioned methods, it is possible to judge which of the methods is to be used to eliminate affect by the application 030 which can increase the I/O amount by the setting modification of the storage subsystem 020. For example, suppose that the I/O amounts from the application (application A) requiring a high-speed I/O performance such as a DB server and an application (application B) not requiring a high-speed I/O performance such as a test server are to be increased. In this case, by limiting the I/O amount from the application B at the storage side port 024, it is possible to eliminate the affect by the I/O amount increase of the application B.

(7) Specific Examples

Figure 12:
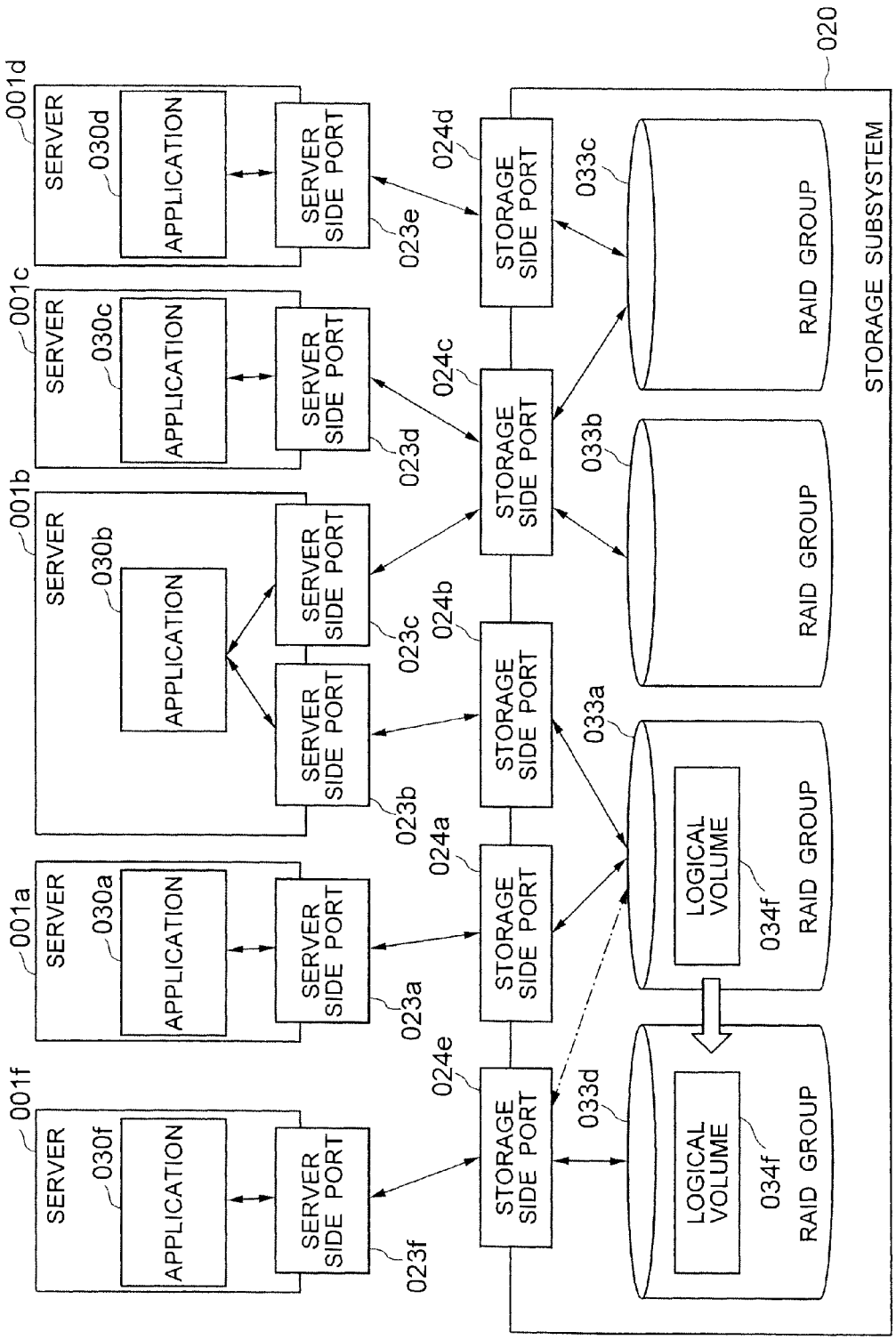
FIG. 12 shows an example of the SAN environment in the embodiment.

Referring to a specific example shown in FIG. 12, explanation will be given on the outline of the present processing. It should be noted that to simplify the explanation, explanation on the cache 021, the file system 031, and the device 032 is omitted. The I/O path information table 202 corresponding to the system configuration shown in FIG. 12 is shown in FIG. 5.

Suppose that the logical volume 034f used by the application 030f is moved from the RAID group 033a to the RAID group 033d. Here, the I/O amount increase application search engine 111 firstly identify a resource whose performance is improved by the method shown in step 1002. In the case shown in FIG. 12, the logical volume 034f is moved to another RAID group 033d and it is judged that the load of the RAID group 033a is reduced.

Next, by using the method shown in step 1003, the I/O amount increase application search engine 111 specifies the application 030 using the RAID group 033a. More specifically, the I/O amount increase application search engine 111 searches for a record having the RAID group 033a in the RAID group name 406 from the I/O pass information table 202 and checks the application name 401 contained in the searched record. This specifies the application 030a and the application 030b as the application 030 whose I/O may be increased.

Furthermore, by using the method shown in steps 1005 and 1006, the I/O amount increase application search engine 111 acquires the resource used by the application 030 and performance information on each resource and lastly, according to the acquired performance information, judges whether the I/O amount of the application 030a and 030b may be increased by the method shown in step 1007.

In the case shown in FIG. 12, for example, the application 030b is specified as the application whose I/O may be increased according to a procedure as follows. Firstly, a record having the application 030a and the application 030b in the application name 401 is searched from the I/O path information table 202. Next, from the searched record, the server name 409, the server side port name 403, the storage side port name 405, and the RAID group name 406 are acquired. In this case, a server 001a and a server 001b are acquired as the server 001; a server side port 023a and a server side port 023b are acquired as the server side port 0223; a storage side port 024a and a storage side port 024b are acquired as the storage side port 024; and a RAID group 033a is acquired as the RAID group 033.

Next, performance of the acquired resource is acquired from the performance information table 201 and it is judged whether the I/O amount of the application 030a and 030b may be increased. For example, when the CPU use ratio of the server 001a or the use ratio of the server side port 023a is 100%, the I/O amount from the application 030a operating in the server 001a to the RAID group 033a will not be increased. Accordingly, the application 030a is specified as the application whose I/O amount will not be increased. Moreover, when the use ratios of the server 001b, the server side port 0234b, and the storage side port 024b are all below 100%, the application 030b using the ports 023b, 024b is specified as the application whose I/O amount may be increased.

Next, according to the method shown in step 1101, the I/O performance lowering storage resource search engine 112 specifies a resource whose I/O load is increased by the I/O amount increase of the application 030b. In the example shown in FIG. 12, for example, according to a procedure shown below, the server side port 023b, the server side port 023c, the storage side port 024b, the storage side port 024c, the RAID group 033a, and the RAID group 033b are specified as the resources whose I/O load may be increased. Firstly, a record having the application 030b for the application name 401 is searched from the I/O path information table 202. Next, from the searched record, the server side port name 403, the storage side port name 405, and the RAID group name 406 are acquired. Thus, it is possible to acquire the server side port 023b, the server side port 023c, the storage side port 024b, the storage side port 024c, the RAID group 033a, and the RAID group 033b. Moreover, the I/O performance lowering storage resource search engine 112 specifies the acquired resource as the resource whose I/O performance may be lowered.

Lastly, the I/O performance lowering application search engine 113 specifies an application having the resource specified by the I/O performance lowering storage resource search engine 112 in the I/O path according to step 1103. In the example shown in FIG. 12, according to a procedure explained below, the application 030a and the application 030c are specified as the application 030 whose I/O performance may be deteriorated by the setting modification of the storage subsystem 020. Firstly, the I/O performance lowering application search engine 113 searches for a record having the server side port 023c for the server side port name 403 or a record having the storage side port 024b or the storage side port 024c for the storage side port name 405 or a record having the RAID group 033a or the RAID group 033b for the RAID group name 406 from the I/O path information table 202 and acquires the application name 401 of the searched record. In this case, it is possible to acquire the application 030a using the RAID group 033a and the application 030c using the storage side port 024c. The I/O performance lowering application search engine 113 specifies the applications 030a and 030c as the application 030 whose I/O performance may be lowered.

(8) Other Embodiments

According to the present embodiment, it is possible to identify the application 030 whose I/O amount may be increased by eliminating the bottleneck and a resource and the application 030 whose I/O performance may be lowered by the I/O amount increase of the application 030 when performing setting modification of the storage subsystem 020.

It should be noted that the setting information input view 301 in the aforementioned embodiment may be extended and a plurality of setting contents may be inputted. By simultaneously inputting a plurality of setting contents, for example, it is possible to identify the range of affect to another application 030 when the I/O path used by the server 001 is modified. When switching of the I/O path used by the server 001 causes modification of the storage side port 024, the cache 021, and the RAID group 033 used by the application 030, the I/O loads on the storage side port 024, the cache 021, and the RAID group 033 which have been used by the application are decreased. For this, the aforementioned case is identical to the case when the logical volume 034 is moved to another storage side port 0224, cache 021, and RAID group 033. Accordingly, by inputting a plurality of setting information in the setting information input view 301, it is possible to identify the application 030 whose I/O amount may be increased by the I/O path modification and the resource and the application 030 whose I/O performance may be lowered by the I/O increase of the application 030.

Furthermore, by applying the present embodiment, when reducing the I/O load on the RAID group, it is possible to decide the logical volume to be moved considering the range of affect of the I/O volume increase of the application 030 using the RAID group to another application 030. More specifically, the processes which will be explained below are executed for each of the logical volumes 034 contained in a particular RAID group 033.

Firstly, a logical volume 034 to be moved is specified in the resource selection region 610 in the setting information input view shown in FIG. 6. Next, the movement of the logical volume 034 is selected in the operation list 621. Next, the storage performance analysis program 110 executes the process explained in the example and displays the I/O performance lowering storage resource display view 303 and the I/O performance lowering application display view 304. Whereby, it is possible to identify the resource and the application which are affected by the movement of each logical volume 034 and accordingly, it is possible to select the setting modification which will not affect a particular application. Moreover, it is possible to select the setting modification which minimizes the number of applications whose I/O performance is affected. It should be noted that here, a list of resources and applications which are affected is displayed. However, it is also possible to display the number of resources and the number of applications which are affected.

Furthermore, it is also possible to display the performance of each resource corresponding to the resource name 801 on the I/O performance storage resource display view 303 after the storage setting modification. Moreover, it is also possible to display the performance of each resource corresponding to the lowering condition 802. This enables check of the I/O amount increase from the application. Moreover, since the range affected by the storage setting modification is identified, it is possible to immediately detect deterioration of the I/O performance caused by the storage setting modification. On the other hand, in the conventional method, a user should manually specify the range of affect, which requires a certain time. This embodiment reduces the labor required for detecting the problem.

By displaying the I/O amount increase application, the I/O performance lowering storage resource, and the I/O performance lowering application on the system configuration of FIG. 12 displayed on the display view, it is possible to rapidly grasp the range affected by the storage setting modification. Furthermore, by displaying the resource affecting others and the resource affected by the setting modification on the system configuration shown in FIG. 12, it is possible to grasp the details of affect caused by the setting modification.

When a task system is formed by a plenty of applications and relationship between some applications is known in advance, this relationship may be used to narrow the application candidates included in the range affected by the setting modification.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising,
at least one server;
at least one storage subsystem; and
a storage management server connected to the at least one storage subsystem and the at least one server via a network, the storage management server comprising:

a first collecting unit configured to collect information on connection relationship between resources on an I/O path from each of applications in the at least one server to a logical volume used by the applications as configuration information from the at least one server and the at least one storage subsystem;

a second collecting unit configured to collect performance information on each of the resources on the I/O path from each of the applications in the at least one server to the logical volume used by the applications from the at least one server and the at least one storage subsystem;

a rule table which includes IF-THEN type rules for avoiding performance deterioration of each application, each of the rules storing a cause and a condition in a preamble part and storing a countermeasure in a conclusion part;

an I/O amount increase application search engine for inputting a setting modification definition for balancing an I/O load of the at least one storage subsystem, specifying a resource on the I/O path whose I/O load is reduced according to the setting modification definition, and identifying a first application whose I/O amount may be increased, the setting modification definition being configured to eliminate a predicted bottleneck that may occur between the at least one server and the at least one storage subsystem and defining movement of the logical volume;

an I/O performance lowering resource search engine for specifying a resource on a I/O path used by the first application whose I/O amount may be increased based on the configuration information; and an I/O performance lowering application search engine for identifying a second application using the resource specified by the I/O performance lowering resource search engine based on the configuration information, wherein the I/O performance lowering application search engine sets the specified I/O performance lowering resource as the cause of the rule and also sets the I/O amount increased path specified by the I/O performance lowering resource search engine as a condition of the rule for the second application, and obtains the countermeasure as the conclusion from the rule, and displays a name of application, the cause, the condition and the countermeasure on a display device.

2. The system according to claim 1, wherein the I/O path from each application in the at least one server to a logical volume in the at least one storage subsystem includes at least one of server side ports and at least one of storage side ports.

3. The system according to claim 2, wherein the I/O amount increase application search engine identifies the first application, if none of the utilization ratio of the server side ports and storage side ports on the I/O path from the first application to the logical volume used by the first application exceeds a predetermined value.

4. The system according to claim 2, wherein the I/O path further includes a disk cache, wherein the rule stores, when the cause is a cache performance deterioration and the condition is that the I/O amount increased between the second application to the storage side port via the cache, the countermeasure is that the cache of a logical volume is made resident.

5. The system according to claim 1,
wherein the I/O performance lowering application search engine displays the name of the second application, the cause and the countermeasure in a table form on the display device.

6. The system according to claim 2,
wherein the rule stores, when the cause is the storage side port performance deterioration and the condition is that the I/O amount increased between the first application to the storage side port, the countermeasure is that the second application is given a priority of using the storage side port.

7. A storage management method for a system having at, least one server, at least one storage subsystem, and a storage management server comprising a rule table and connected to the at least one storage subsystem and the at least one server via a network, the method comprising:
collecting information on connection relationship between resources on an I/O path from each of applications in the at least one server to a logical volume used by the applications as, configuration information from the at least one server and the at least one storage subsystem;
collecting performance information on each of the resources on the I/O path from each of the applications in the at least one server to the logical volume used by the applications from the at least one server and the at least one storage subsystem;
inputting a setting modification definition for balancing an I/O load of the at least one storage subsystem, specifying a resource on the I/O path whose I/O load is reduced according to the setting modification definition;
identifying a first application whose I/O amount may be increased, the setting modification definition being configured to eliminate a predicted bottleneck that may occur between the at least one server and the at least one storage subsystem and defining movement of the logical volume;
specifying a resource on a I/O path used by the first application whose I/O amount may be increased based on the configuration information;
identifying a second application using the resource specified based on the configuration information,
wherein the rule table includes IF-THEN type rules for avoiding performance deterioration of each application, each of the rules storing a cause and a condition in a preamble part and storing a countermeasure in a conclusion part;
setting the specified I/O performance lowering resource as the cause of the rule;
setting the I/O amount increased path specified in the specifying a resource step as a condition of the rule for the second application;
obtaining the countermeasure as the conclusion from the rule; and
displaying a name of application, the cause, the condition and the countermeasure on a display device.

8. The method according to claim 7,
wherein the I/O path from each application in the at least one server to a logical volume in the at least one storage subsystem includes at least one of server side ports and at least one of storage side ports.

9. The method according to claim 8, further comprising:
identifying the first application, if none of the utilization ratio of the server side ports and storage side ports on the I/O path from the first application to the logical volume used by the first application exceeds a predetermined value.

10. The method according to claim 8,
wherein the I/O path further includes a disk cache,
wherein the rule stores, when the cause is a cache performance deterioration and the condition is that the I/O amount increased between the second application to the storage side port via the cache, the countermeasure is that the cache of a logical volume is made resident.

11. The method according to claim 7, further comprising:
displaying the name of the second application, the cause and the countermeasure in a table form on the display device.

12. The method according to claim 8,
wherein the rule, stores, when the cause is the storage side port performance deterioration and the condition is that the I/O amount increased between the first application to the storage side port, the countermeasure is that the second application is given a priority of using the storage side port.

13. A non-transitory computer readable storage medium storing a program for a storage management method for a, system having at least one server, at least one storage, subsystem, and a storage management server comprising a rule table and connected to the at least one storage subsystem and the at least one server via a network, the method comprising:
collecting information on connection relationship between resources on an I/O path from each of applications in the at least one server to a logical volume used by the applications as configuration information from the at least one server and the at least one storage subsystem;
collecting performance information on each of the resources on the I/O path from each of the applications in the at least one server to the logical volume used by the applications from the at least one server and the at least one storage subsystem;
inputting a setting modification definition for balancing an I/O load of the at least one storage subsystem, specifying a resource on the I/O path whose I/O load is reduced according to the setting modification definition;
identifying a first application whose I/O amount may be increased, the setting modification definition being configured to eliminate a predicted bottleneck that may occur between the at least one server and the at least one storage subsystem and defining movement of the logical volume;
specifying a resource on a I/O path used by the first application whose I/O amount may be increased based on the configuration information;
identifying a second application using the resource specified based on the configuration information,
wherein the rule table includes IF-THEN type rules for avoiding performance deterioration of each application, each of the rules storing a cause and a condition in a preamble part and storing a countermeasure in a conclusion part;
setting the specified I/O performance lowering resource as the cause of the rule;
setting the I/O amount increased path specified in the specifying a resource step as a condition of the rule for the second application;
obtaining the countermeasure as the conclusion from the rule; and
displaying a name of application, the cause, the condition and the countermeasure on a display device.

* * * * *